United States Patent
Fei et al.

(10) Patent No.: US 9,735,882 B2
(45) Date of Patent: Aug. 15, 2017

(54) APPARATUS, SYSTEM AND METHOD FOR WIRELESS DATA TRANSMISSION BY USING DISPLAY BACKLIGHT

(71) Applicant: SCHNEIDER ELECTRIC INDUSTRIES SAS, Rueil-Malmaison (FR)

(72) Inventors: Weihe Fei, Shanghai (CN); Chanjuan Li, Shanghai (CN); Emmanuel Dreina, Grenoble (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 14/856,769

(22) Filed: Sep. 17, 2015

(65) Prior Publication Data

US 2016/0080089 A1    Mar. 17, 2016

(30) Foreign Application Priority Data

Sep. 17, 2014  (CN) .......................... 2014 1 0475006

(51) Int. Cl.
*H04B 10/114*  (2013.01)
*H04B 10/116*  (2013.01)
*H04B 10/524*  (2013.01)

(52) U.S. Cl.
CPC ......... *H04B 10/524* (2013.01); *H04B 10/116* (2013.01); *H04B 10/1141* (2013.01)

(58) Field of Classification Search
CPC .. H04B 10/524; H04B 10/1141; H04B 10/116
USPC ...................................................... 398/118
See application file for complete search history.

(56) References Cited

U.S. PATENT DOCUMENTS

| | | | | |
|---|---|---|---|---|
| 4,652,855 A * | 3/1987 | Weikel | ................... | G01R 21/00 340/870.02 |
| 2002/0039068 A1* | 4/2002 | Holowick | .............. | G01D 4/006 340/870.02 |
| 2011/0069962 A1* | 3/2011 | Castor | ................ | H04B 10/1149 398/115 |

(Continued)

FOREIGN PATENT DOCUMENTS

| | | |
|---|---|---|
| EP | 1863203 A1 | 12/2007 |
| JP | 2012195763 A | 10/2012 |

OTHER PUBLICATIONS

Extended European Search Report from corresponding European Application No. 15306395.3 dated Feb. 22, 2016.

*Primary Examiner* — Dalzid Singh
(74) *Attorney, Agent, or Firm* — Lando & Anastasi, LLP

(57) ABSTRACT

The present disclosure provides an apparatus, a system and a method for wireless data transmission by using a display backlight. The apparatus for transmitting wireless data by using a display backlight according to the present disclosure may include: a data storage unit for storing data to be transmitted; a main control unit for reading the data stored in the data storage unit; a signal modulation unit for modulating the data with a predetermined signal modulation method under the control of the main control unit to generate and output a sequence of switching pulse signals; a light source driving circuit for generating backlight driving switching pulse signals according to the sequence of switching pulse signals; and a display backlight member for outputting a sequence of light and shade signals.

16 Claims, 6 Drawing Sheets

(56) References Cited

U.S. PATENT DOCUMENTS

| | | | |
|---|---|---|---|
| 2012/0280833 A1* | 11/2012 | Jonsson | G06F 13/385 340/870.02 |
| 2013/0321254 A1* | 12/2013 | Kim | G09G 3/36 345/102 |
| 2014/0267466 A1* | 9/2014 | Takagi | G09G 3/36 345/691 |
| 2015/0195394 A1* | 7/2015 | Bietz | H04M 1/7253 455/419 |

* cited by examiner

APPARATUS, SYSTEM AND METHOD FOR WIRELESS DATA TRANSMISSION BY USING DISPLAY BACKLIGHT

CROSS-REFERENCE TO RELATED APPLICATION

This application claims the benefit under 35 U.S.C. §119 of Chinese Patent Application No. 201410475006.4 filed on Sep. 17, 2014 which is hereby incorporated herein by reference in its entirety for all purposes.

TECHNICAL FIELD

The present disclosure relates to an apparatus, a system and a method for a wireless data transmission. More particular, the present disclosure relates to an apparatus, a system and a method for wireless data transmission by using a display backlight.

BACKGROUND

In the digital era where all kinds of electrical equipments aim to the intelligent development, the communication and information sharing among the equipments has become the general trend of the modern industry and even the human life's requirement. In the field of data communications, data transmission technology is one of the most important and the most basic technology.

Various data transmission technologies have emerged, including wired data communication such as Modbus, CAN bus, USB, Ethernet, as well as wireless data communication such as WIFI, ZigBee, Bluetooth, NFC, etc.

The methods for the Wired data transmission mentioned have to change the structure of the existing equipment and also need to add driving chips and memory, some of them further require network infrastructures and various protection measures, such as an antistatic protection, an insulation protection and the like, which cause significant increases in system cost.

In above methods for the wireless data transmission, locations of antennas are subjected to several limitations, such as shielding, interference, and so on, which brings difficulty to the design of EMC/EMI. In the wireless data transmission method, there is further proposed an optical image method, wherein a display displays two-dimensional codes, and wherein data is read through shooting and scanning by mobile terminals such as a phone. This method would not change the hardware structure of the original equipment, but adds requirements for the display performance, such as a better contrast and a larger pixel dot density, such that the optical image data transmission method cannot be applied to some display instruments. In addition, displaying the two-dimensional codes on the display occupies some display area, and it will affect the display of the original contents and affect the actual usage.

In the digital era, various devices are required to have the function of data communication, and usually in the implementation of a new data transmission method, the original hardware system is needed to be modified, such that the original devices are forced to be dropped and replaced with new devices. However, when the devices are traded in, usually they are limited by various facilities, such as a space size, the network infrastructure, the environment and so on.

The backlight of the display in an instrument/meter is usually used for lighting the display and improving a readability of the display, but has no data transmission function.

However, the present disclosure expects to overcome the problems existed in the prior art by means of a visible light communication technology developed recently, in order to make it possible to avoid alteration of the hardware system in the original devices and overcome the device compatibility issues, which would facilitate the promotion and usage of this technique.

SUMMARY

An object of the present disclosure is to provide a new system and a new method for wireless data transmission, which realize the wireless data transmission using a display backlight in an existing device without changing a hardwire structure of the device, in order to provide a most convenient solution with the lowest cost for reading and recording system data by a user, so that the user can enjoy the wireless data transmission function with the device without replacing any original hardwire members, therefore it is possible to realize an intelligent and online management of the user data.

According to an aspect of the present disclosure, there is provided an apparatus for transmitting wireless data by using a display backlight, comprising: a data storage unit configured to store data to be transmitted; a main control unit configured to read and control the data stored in the data storage unit; a signal modulation unit configured to modulate the data with a predetermined signal modulation method under the control of the main control unit to generate and output a sequence of switching pulse signals; a light source driving circuit configured to generate a backlight driving switching pulse signal according to the sequence of switching pulse signals; and a display backlight member configured to output a sequence of light and dark signals, driven by the backlight driving switching pulse signal.

In an example, the predetermined signal modulation method is a signal modulation method of Different Pulses in Fixed Period Modulation, wherein a pulse period is fixed, one digital bit state is transmitted in each period, a first number of rectangle wave pulses with a first width is transmitted in one period in order to represent a first digital bit state, and a second number of rectangle wave pulses with a second width is transmitted in another period in order to represent a second digital bit state.

In an example, a sum of widths of pulse high levels in the first number of rectangle wave pulses is equal to a sum of widths of pulse high levels in the second number of rectangle wave pulses.

In an example, the predetermined signal modulation method is a signal modulation method of Variable Pulse Period Modulation, wherein the pulse period is variable, a pulse with a first pulse width representing a first digital bit state or another pulse with a second pulse width representing a second digital bit state is transmitted in one period, the first pulse width is different from the second pulse width.

In an example, a ratio of a pulse low level time to a pulse high level time during the digital bit being transmitted is smaller than a predetermined threshold.

In an example, the predetermined threshold is 1%.

In an example, the data is data related to numerical readings of measurement instruments, and the main control unit reads the data stored in the data storage unit periodically or as required.

In an example, the main control unit, the data storage unit, the signal modulation unit, the light source driving unit and the display backlight member are implemented with corresponding components in a measurement instrument.

According to another aspect of the present disclosure, there is further provided an apparatus for receiving wireless data by using a display backlight, comprising: an optical probe configured to receive a sequence of light and dark signals transmitted with the display backlight and optically-electrically convert the sequence of light and dark signals to generate a sequence of switching pulse signals; a main control unit; a digital decoding unit configured to demodulate the sequence of switching pulse signals with a predetermined signal demodulation method under the control of the main control unit to generate recovered data; and a digital processing and displaying unit configured to process the recovered data under the control of the main control unit.

In an example, the predetermined signal demodulation method performs the demodulation according to modulation rules as follows: a pulse period is fixed, one digital bit state is transmitted in each period, a first number of rectangle wave pulses with a first width is transmitted in one period in order to represent a first digital bit state, and a second number of rectangle wave pulses with a second width is transmitted in another period in order to represent a second digital bit state.

In an example, a sum of widths of pulse high levels in the first number of rectangle wave pulses is equal to a sum of widths of pulse high levels in the second number of rectangle wave pulses.

In an example, the predetermined signal demodulation method performs the demodulation according to modulation rules as follows: the pulse period is variable, a pulse with a first pulse width representing a first digital bit state or another pulse with a second pulse width representing a second digital bit state is transmitted in one period, the first pulse width is different from the second pulse width.

In an example, a ratio of a pulse low level time to a pulse high level time during the digital bit being transmitted is smaller than a predetermined threshold.

In an example, the predetermined threshold is 1%.

In an example, the data is data related to numerical readings of measurement instruments.

In an example, the optical probe receives the sequence of light and dark signals periodically or as required.

In an example, the process on the recovered data comprises displaying the data, storing the data and transmitting the data to a higher level network.

According to another aspect of the present disclosure, there is further provided a system for wireless data transmission using a display backlight, comprising the apparatus for transmitting the wireless data described above and the apparatus for receiving the wireless data described above.

According to another aspect of the present disclosure, there is further provided a method for transmitting wireless data by using a display backlight, comprising: modulating data to be transmitted with a predetermined signal modulation method to generate and output a sequence of switching pulse signals; generating a backlight driving switching pulse signal according to the sequence of switching pulse signals; and issuing a sequence of light and dark signals by a display backlight member driven by the backlight driving switching pulse signal.

In an example, the predetermined signal modulation method is a signal modulation method of Different Pulses in Fixed Period Modulation, wherein a pulse period is fixed, one digital bit state is transmitted in each period, a first number of rectangle wave pulses with a first width is transmitted in one period in order to represent a first digital bit state, and a second number of rectangle wave pulses with a second width is transmitted in another period in order to represent a second digital bit state.

In an example, a sum of widths of pulse high levels in the first number of rectangle wave pulses is equal to a sum of widths of pulse high levels in the second number of rectangle wave pulses.

In an example, the predetermined signal modulation method is a signal modulation method of Variable Pulse Period Modulation, wherein the pulse period is variable, a pulse with a first pulse width representing a first digital bit state or another pulse with a second pulse width representing a second digital bit state is transmitted in one period, the first pulse width is different from the second pulse width.

In an example, a ratio of a pulse low level time to a pulse high level time during the digital bit being transmitted is smaller than a predetermined threshold.

In an example, the predetermined threshold is 1%.

In an example, the data is data related to numerical readings of measurement instruments.

In an example, the data is transmitted periodically or as required.

According to another aspect of the present disclosure, there is further provided a method for receiving wireless data by using a display backlight, comprising: receiving, by an optical probe, a sequence of light and dark signals transmitted with the display backlight and optically-electrically converting the sequence of light and dark signals to generate a sequence of switching pulse signals; demodulating the sequence of switching pulse signals with a predetermined signal demodulation method to generate recovered data.

In an example, the predetermined signal demodulation method performs the demodulation according to modulation rules as follows: a pulse period is fixed, one digital bit state is transmitted in each period, a first number of rectangle wave pulses with a first width is transmitted in one period in order to represent a first digital bit state, and a second number of rectangle wave pulses with a second width is transmitted in another period in order to represent a second digital bit state.

In an example, a sum of widths of pulse high levels in the first number of rectangle wave pulses is equal to a sum of widths of pulse high levels in the second number of rectangle wave pulses.

In an example, the predetermined signal demodulation method performs the demodulation according to modulation rules as follows: the pulse period is variable, a pulse with a first pulse width representing a first digital bit state or another pulse with a second pulse width representing a second digital bit state is transmitted in one period, the first pulse width is different from the second pulse width.

In an example, a ratio of a pulse low level time to a pulse high level time during the digital bit being transmitted is smaller than a predetermined threshold.

In an example, the predetermined threshold is 1%.

In an example, the data is data related to numerical readings of measurement instruments.

In an example, the optical probe receives the sequence of light and dark signals periodically or as required.

In an example, the method for receiving the wireless data further comprises processing the recovered data, including displaying the data, storing the data and transmitting the data to a higher level network.

According to another aspect of the present disclosure, there is further provided an electricity meter comprising the apparatus for transmitting wireless data described above, wherein the data comprises power consumption data measured by the electricity meter and an identifier of the electricity meter.

According to another aspect of the present disclosure, there is further provided an optical recording pen for recording power consumption numerical readings measured by the electricity meter described above, comprising: an optical probe, disposed at a head position of the optical recording pen, configured to read a sequence of light and dark signals transmitted with a display backlight in the electricity meter from the electricity meter and optically-electrically convert the sequence of light and dark signals so as to generate a sequence of switching pulse signals; a MCU configured to demodulate and further process the sequence of switching pulse signals to obtain power consumption numerical readings of the electricity meter and an identifier of the electricity meter as needed; a recording pen display, located at a tail of the optical recording pen, configured to display the obtained power consumption numerical readings of the electricity meter.

In an example, the optical recording pen further comprises: a storage configured to store the obtained power consumption data; a data line interface, located at an end of the tail of the optical recording pen and connected with a data interface of an upper computer to transfer the obtained data to the upper computer.

In an example, the optical recording pen further comprises a button on the optical recording pen, and a display mode of the power consumption numerical readings on the electricity meter is switched by operating the button.

According to another aspect of the present disclosure, there is further provided an optical electricity meter-reading system comprising: at least one electricity meter including the apparatus for transmitting wireless data described above, wherein the data comprises power consumption data measured by the electricity meter and an identifier of the electricity meter; and an optical recording pen. The optical recording pen comprises: an optical probe configured to read a sequence of light and dark signals transmitted with a display backlight in the electricity meter from the electricity meter and optically-electrically convert the sequence of light and dark signals, to generate a sequence of switching pulse signals; a receiving end microprocessor configured to demodulate and further process the sequence of switching pulse signals, so as to obtain the power consumption numerical readings of the electricity meter and the identifier of the electricity meter; and a battery configured to supply operating power to respective members in the optical recording pen.

In the optical electricity meter-reading system, the optical recording pen further comprises: at least one of a USB interface and a WIFI module, configured to transmit the obtained power consumption numerical readings of the electricity meter and the identifier of the electricity meter to a upper computer under the control of the receiving end microprocessor.

In the optical electricity meter-reading system, the optical recording pen further comprises: a sensitivity adjuster configured to adjust a sensitivity of the optical probe.

According to another aspect of the present disclosure, there is further provided a smart phone electricity meter-reading system, comprising: at least one electricity meter including the apparatus for transmitting wireless data described above, wherein the data comprises power consumption data measured by the electricity meter and an identifier of the electricity meter; a data receiving end apparatus formed by a smart phone. The data receiving end apparatus comprises: a camera on the smart phone configured to shoot images of a display screen of the electricity meter; and an application built in the smart phone configured to analyze a light and dark timing in a background of the shot image so as to obtain a sequence of light and dark signals issued by a display backlight member of the electricity meter, process and demodulate the sequence of light and dark signals to obtain power consumption numerical readings of the electricity meter and identifier of electricity meter, and perform data analysis and process on the power consumption numerical readings of the electricity meter and the identifier of the electricity meter.

According to another aspect of the present disclosure, there is further provided a smart phone electricity meter-reading system, comprising: at least one electricity meter including the apparatus for transmitting wireless data described above, wherein the data comprises power consumption data measured by the electricity meter and an identifier of the electricity meter; a data receiving end apparatus including: an external optical probe configured to detect a sequence of light and dark signals issued by a display backlight member in the electricity meter and optically-electrically convert the sequence of light and dark signals into electrical signals to output, wherein an output interface member of the optical probe is an earphone plug compatible with an earphone jack on the smart phone; and the smart phone configured to receive the electrical signals converted by the optical probe via the earphone plug, process and demodulate the electrical signals through application software built in the smart phone so as to obtain required power consumption numerical readings of the electricity meter and identifier of electricity meter, and perform data analysis and process the power consumption numerical readings of the electricity meter and the identifier of the electricity meter.

In the smart phone electricity meter-reading system, the data receiving end apparatus further comprises: a sensitivity adjuster configured to adjust a sensitivity of the optical probe.

According to another aspect of the present disclosure, there is further provided a smart phone electricity meter-reading system, comprising: at least one electricity meter including the apparatus for transmitting wireless data described above, wherein the data comprises power consumption data measured by the electricity meter and an identifier of the electricity meter; a data receiving end apparatus including: an external optical probe configured to detect a sequence of light and dark signals issued by a display backlight member in the electricity meter and optically-electrically convert the sequence of light and dark signals into electrical signals, process and demodulate the electrical signals through firmware of a microprocessor in the optical probe so as to obtain power consumption numerical readings of the electricity meter and an identifier of the electricity meter, wherein an output interface member of the optical probe is a USB plug compatible with a USB jack on a smart phone; and the smart phone configured to receive the obtained power consumption numerical readings of the electricity meter and the identifier of the electricity meter via the USB plug, and perform data analysis and process the power consumption numerical readings of the electricity meter and the identifier of the electricity meter.

In the smart phone electricity meter-reading system, the data receiving end apparatus further comprises: a sensitivity adjuster configured to adjust a sensitivity of the optical probe.

As compared with the prior art, the system and method for wireless data transmission according to the present disclosure are advantageous in that:

1. with the optical transmission method, it eliminates electrical disturbances and has a function of electrical isolation automatically;

2. no dedicated driving chip is required and no hardware cost is added to the product without changing the original hardware design of the product, which is benefit for the product promotion;

3. the contents displayed on the display are not changed, and the user's reading would not be disturbed; and It can be easy to implement the data transmission from the device to the smart phone, thus it is possible that a location management of the device data is changed to a cloud management of the device data.

BRIEF DESCRIPTION OF THE DRAWINGS

Exemplary embodiments of the present disclosure will become more fully understood and apparent for those skilled in the art from the detailed description given hereinafter and the accompanying drawings which are given by way of illustration only, and thus are not limitative of the present disclosure and wherein.

DETAILED DESCRIPTION

Figure 1:
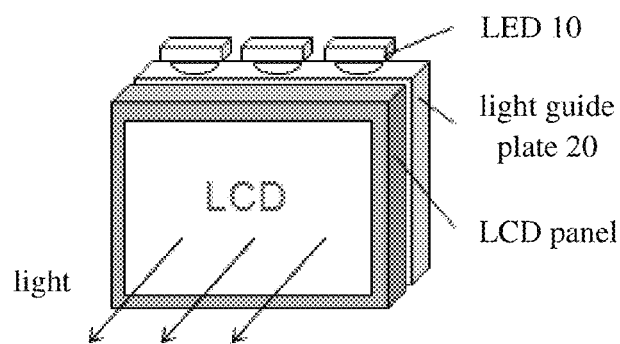
FIG. 1 illustrates a display for implementing wireless data transmission according to the present disclosure.

FIG. 1 illustrates a display for implementing wireless data transmission according to the present disclosure. As illustrated in FIG. 1, a backlight of a display 1 are implemented by Light Emitting Diodes (LEDs) 10 through a light guide plate 20 by which point light sources issued from the LED are converted into a plane light source, and the LED 10 is turned on to emit light when a high potential voltage is applied to the LED 10 while the LED 10 is turned off and light is off when a low potential voltage is applied to the LED 10. Generally, a driving of the backlight components is realized by means of a string of sequential high-low potential pulse signals, such that the LED 10 emits light and turns off the light continually. Because a frequency of the pulse signal is high (being greater than 100 Hz) and a human's eyes have a visual staying effect, the human's eyes would not perceive flickers in the light sources and view that the light sources emit light continuously. This is as same as a light emitting process of a display in the prior art.

Unlike the light emitting process of the display in the prior art, displays of the present disclosure may modulate a pulse driving signal of the backlight member so that the pulse driving signal comprises data to be transmitted, therefore the data can be transmitted through a sequence of lighting on and off signals of the light source while the backlight member is lighted according to the present disclosure.

According to the present disclosure, to receive the data, an optical probe is disposed in front of the display, which recovers pulse switching electrical signals by an optical-electrical conversion and finds out a modulated data from the pulse switching electrical signal with a decoding process, so that the transmitting and receiving of the data using the display backlights is realized.

Figure 2:
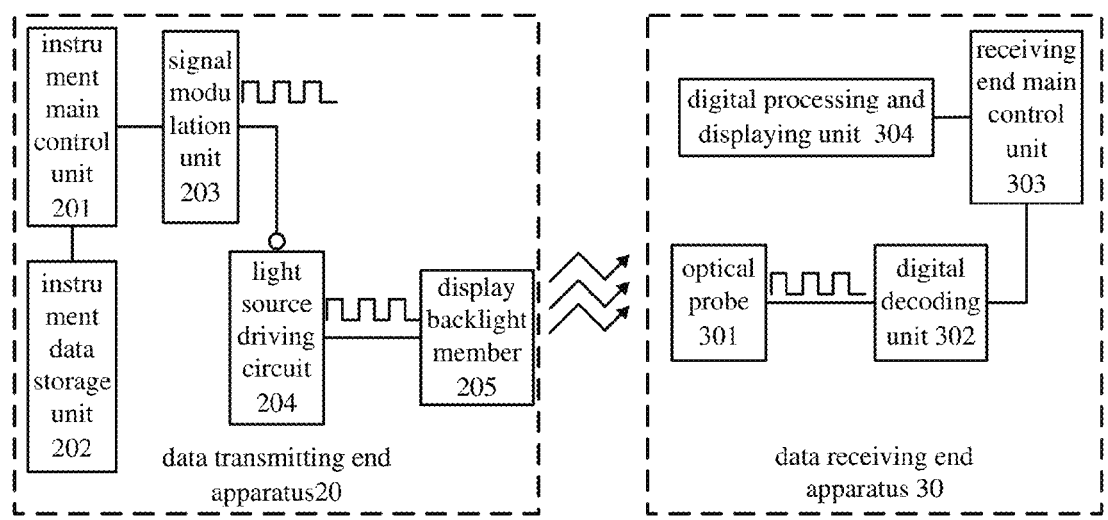
FIG. 2 illustrates a detailed block diagram of a system for wireless data transmission according to the present disclosure.

FIG. 2 illustrates a detailed block diagram of a system for wireless data transmission according to the present disclosure. As illustrated in FIG. 2, the system for wireless data transmission according to the present disclosure comprises a data transmitting end apparatus 20 and a data receiving end apparatus 30. In an example, the data transmitting end apparatus 20 comprises an instrument main control unit 201, an instrument data storage unit 202, a signal modulation unit 203, a light source driving circuit 204 and a display backlight member 205; the data receiving end apparatus 30 comprises an optical probe 301, a digital decoding unit 302, a receiving end main control unit 303 and a digital processing and displaying unit 304.

In the data transmitting end apparatus 20, the instrument main control unit 201 reads data stored in the instrument data storage unit 202, such as data related to numerical readings measured by an instrument, periodically or as needed, controls the signal modulation unit 203 to modulate the read data so as to generate a sequence of switching pulse signals, the signal modulation unit 203 outputs the sequence of switching pulse signals to the light source driving circuit 204, the light source driving circuit 204 generates a backlight driving switching pulse signal according to the sequence of switching pulse signals so as to drive the display backlight member 205 to issue a sequence of light and dark signals. The instrument main control unit 201, the instrument data storage unit 202, the signal modulation unit 203, the light source driving circuit 204 and the display backlight member 205 included in the data transmitting end apparatus 20 are all implemented with corresponding components in the instrument in the prior art without adding any additional hardware members in the instrument.

Of course, the instrument main control unit 201, the instrument data storage unit 202 and the signal modulation unit 203 included in the data transmitting end apparatus 20 may also be implemented with, for example, dedicated modules, instead of the corresponding components in the instrument in the prior art.

In the data receiving end apparatus 30, the optical probe 301 detects the sequence of light and dark signals transmitted from the display backlight member 205 periodically or as needed, and optically-electrically converts the sequence of light and dark signals to obtain the sequence of switching pulse signals. Under the control of the receiving end main control unit 303, the sequence of switching pulse signals is demodulated by the digital decoding unit 302 and recovered data corresponding to the data read by the instrument main control unit 201 is obtained. The receiving end main control unit 303 controls the digital processing and displaying unit 304 to process the recovered data which is received, and these processes comprise displaying the data, storing the data and transmitting the data to a higher level network so as to realize an intelligent management and higher level information processing to the instrument data.

Regarding the signal modulation, in order to avoid flickers in the display backlight, the present disclosure proposes a signal modulation method which is called Different Pulses in Fixed Period Modulation, wherein a pulse period is fixed, one digital bit state is transmitted in each period, a first number of rectangle wave pulses with a first width is transmitted in one period in order to represent a first digital bit state, and a second number of rectangle wave pulses with a second width is transmitted in another period in order to represent a second digital bit state.

In order that brightness effects of the display backlight member 205 are identical no matter whether the digital bit '0' or digital bit '1' is transmitted, a sum of widths of pulse high levels in the first number of rectangle wave pulses may be further equal to a sum of widths of pulse high levels in the second number of rectangle wave pulses.

Figure 3:
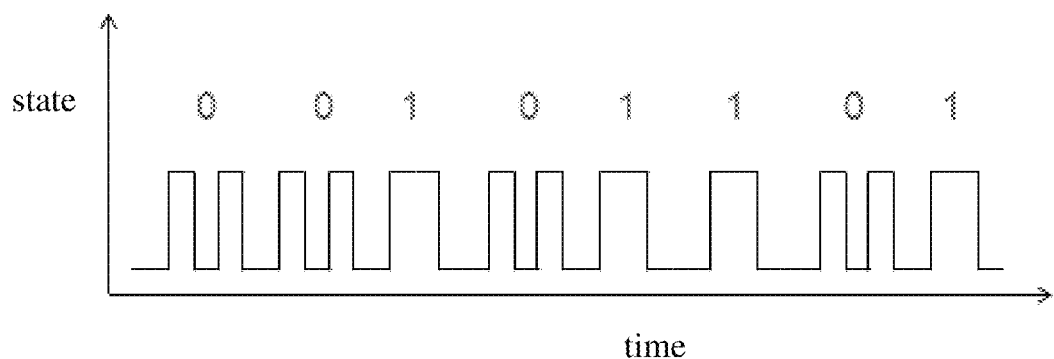
FIG. 3 illustrates an example of a waveform of a different pulse modulation according to the present disclosure.

FIG. 3 illustrates an example of a waveform of the Different Pulses in Fixed Period Modulation according to the present disclosure. For example, one digital bit state (for example, the bit '0') may be represented by transmitting two rectangle wave pulse with a narrow width continually in one period, while another digital bit state (for example, the bit '1') may be represented by transmitting one rectangle wave pulse with a wide width in one period, and the width of the wide pulse is equal to the sum of the widths of the two narrow pulses, thus the brightness effects of the display backlight member 205 are identical no matter whether the digital bit '0' or '1' is transmitted.

The present disclosure further proposes a signal demodulation method for performing an inverse demodulation processing according to the modulation method of Different Pulses in Fixed Period Modulation described above.

Figure 4:
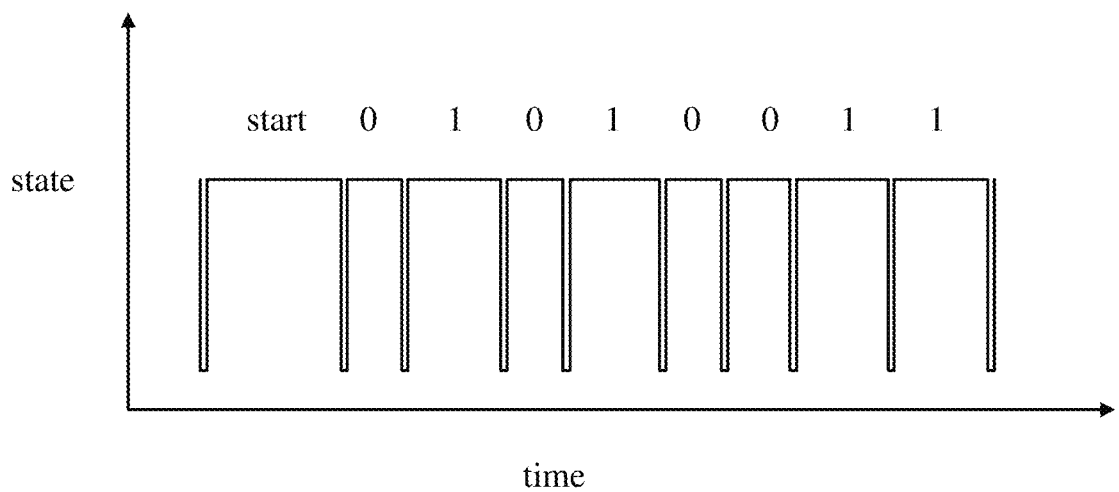
FIG. 4 illustrates an example of a waveform of a variable period pulse modulation according to the present disclosure.

Regarding the signal modulation, in order to avoid flickers in the display backlight, the present disclosure further proposes a signal modulation method called a Variable Pulse Period Modulation, wherein the pulse period is variable, a pulse with a first pulse width representing a first digital bit state or another pulse with a second pulse width representing a second digital bit state is transmitted in one period, the first pulse width is different from the second pulse width. A pulse low level time may be identical or different in the pulse period transmitting the digital bits. FIG. 4 illustrates an example of a waveform of the Variable Pulse Period Modulation according to the present disclosure.

Because the backlight brightness as the digital bit is transmitted is smaller than the backlight brightness as no digital bit is transmitted, the pulse low level time during the digital bit is transmitted would be ensured to be short enough in order that the human's eyes would not perceive an effect of a little dark in the backlight brightness as the digital bit is transmitted. Because the pulse low level time is short enough (for example, a ratio of the pulse low level time to a pulse high level time during the digital bit is transmitted is smaller than 1%), the effect of the pulse low level caused on the backlight brightness can be ignored, thus the human's eyes would not perceive the effect on the backlight brightness as the different digital bits are transmitted.

The present disclosure further proposes a signal demodulation method for performing an inverse demodulation process according to the modulation method of Variable Pulse Period Modulation described above.

The Different Pulses in Fixed Period Modulation along its demodulation scheme and the Variable Pulse Period Modulation along its demodulation scheme are only illustrative and the present disclosure is not limited thereto. Obviously the present disclosure may utilize any other modulation and demodulation schemes, as long as they can meet actual requirements.

Figure 5:
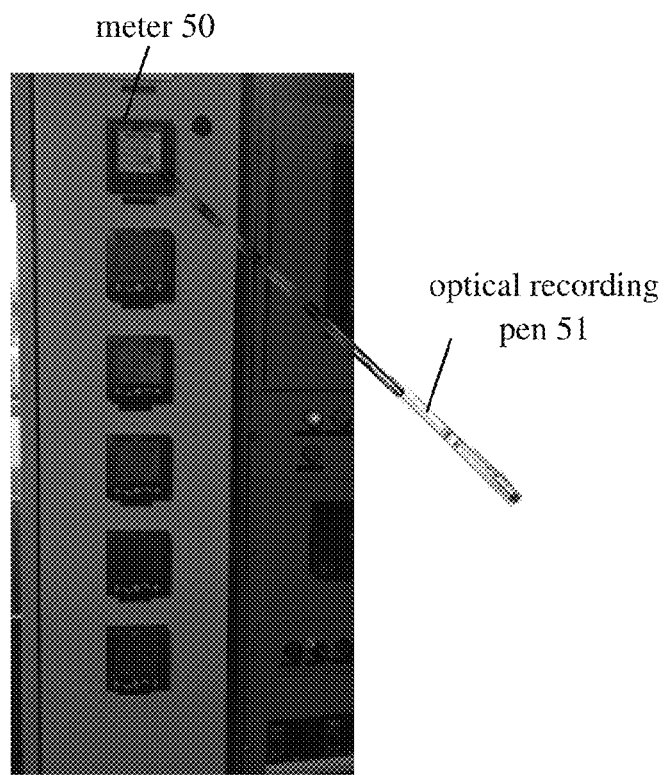
FIG. 5 illustrates a first embodiment, namely an optical electricity meter-reading system, to which the system for wireless data transmission according to the present disclosure is applied.

FIG. 5 illustrates a first embodiment, namely an optical electricity meter-reading system, to which the system for wireless data transmission according to the present disclosure is applied.

In some places without a network infrastructure, operators have to record readings from electricity meters installed at locations periodically to determine the electrical power consumption, their workloads are great and the process is cumbersome. Also, the current power system applies a differential pricing on the power consumption, which further increases the workload of the recorder. Additionally, in some situations, the installation position of the electricity meter is too high to view. In these locations, the above problems can be settled by using an optical recording pen conveniently, as illustrated in an electricity meter field view of FIG. 5. FIG. 5 illustrates a plurality of electricity meters 50 equipped with the displays and an optical recording pen 51 which is recording the electricity meter data.

According to an optical electricity meter reading system of the present disclosure, a unique identifier is assigned to each electricity meter 50 as installed, and the electricity meter 50 comprises the respective members of the data transmitting end apparatus 20 illustrated in FIG. 2. In an example, a storage unit (not shown), corresponding to the instrument data storage unit 202, in the electricity meter 50 stores the unique identifier of the electricity meter and the power consumption data measured by the electricity meter 50. In view of the hardware structure, the electricity meter 50 shown in FIG. 5 is identical with a electricity meter in the prior art.

According to the operation principle explained in connection with FIGS. 2-3, the electricity meter 50 transmits the power consumption data along with its own identifier using the display backlight of the electricity meter through the optical method according to the present disclosure.

An optical probe is disposed at a head position of the optical recording pen 51 illustrated in FIG. 5, which reads the sequence of light and dark signals transmitted with the display backlight in the electricity meter from the electricity meter 50 and optically-electrically converts the sequence of light and dark signals so as to generate the sequence of switching pulse signals. An embedded MCU is disposed in optical recording pen 51, which demodulates and further processes the sequence of switching pulse signals to obtain required power consumption numerical readings of the electricity meter and the identifier of the electricity meter. A display is disposed at a tail of the optical recording pen 51, and the user may switch a display mode for displaying the recorded respective power consumption numerical readings of the electricity meter by pressing a button on the pen. Further, the optical recording pen 51 further comprises a storage configured to store the power consumption data automatically. A data line interface is located at an end of the tail of the optical recording pen 51, which may be connected with a USB interface of a computer, such that the recorded data can be transferred to the computer.

Figure 6:
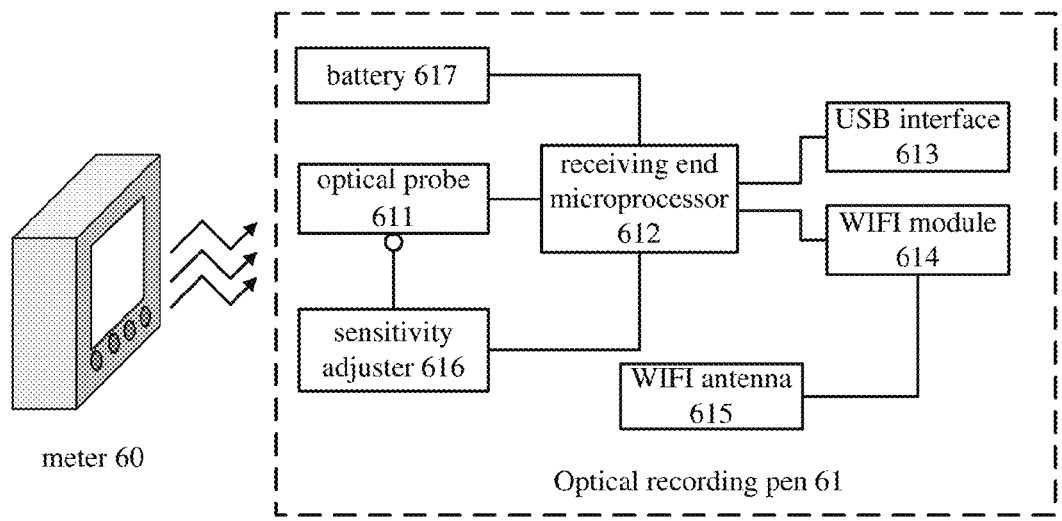
FIG. 6 illustrates an exemplary block diagram of a structure of the optical electricity meter-reading system shown in FIG. 5.

FIG. 6 illustrates an exemplary block diagram of a detailed structure of the optical electricity meter-reading system shown in FIG. 5. The optical electricity meter-reading system according to the present disclosure comprises an electricity meter 60 and an optical recording pen 61 for reading the power consumption data of the electricity meter. Although only one electricity meter 60 is illustrated in FIG. 6, obviously the optical electricity meter-reading system according to the present disclosure may comprise more than one electricity meter. Because the hardware components of the electricity meter 60 are the same as those in the prior art, which may refer to the description for the data transmitting end apparatus 20 made in connection with FIG. 2, a detailed structure of the data transmitting apparatus disposed in the electricity meter 60 is omitted in FIG. 6 and the electricity meter 60 is only illustrated as a whole.

The optical recording pen 61 illustrated in FIG. 6 comprises an optical probe 611, a receiving end microprocessor 612, a battery 617 and output interface members for transferring the related numerical readings of the electricity meter to an upper level data processing apparatus (not shown), such as a USB interface 613 and a WIFI module 614. Further, the optical recording pen 61 further comprises a sensitivity adjuster 616 configured to adjust a sensitivity of the optical probe 611 and a WIFI antenna 615 for communicating with the WIFI module.

In the optical recording pen 61, the optical probe 611 detects the sequence of light and dark signals transmitted with the display backlight in the electricity meter and optically-electrically converts the sequence of light and dark signals, to generate the sequence of switching pulse signals, wherein the power consumption data of the electricity meter and its own identifier are modulated into the received sequence of light and dark signals. Under the control of the receiving end microprocessor 612, the sequence of switching pulse signals are demodulated, and the recovered data corresponding to the power consumption numerical readings of the electricity meter and the identifier of the electricity meter itself are obtained. The receiving end microprocessor 612 controls the USB interface 613 or the WIFI module 614 to transfer the recovered data to the upper level data processing apparatus (not shown), so that the intelligent management and even higher level data processing for the electricity meter's data can be realized. The battery 617 supplies operating power to respective members in the optical recording pen 61.

Figure 7:
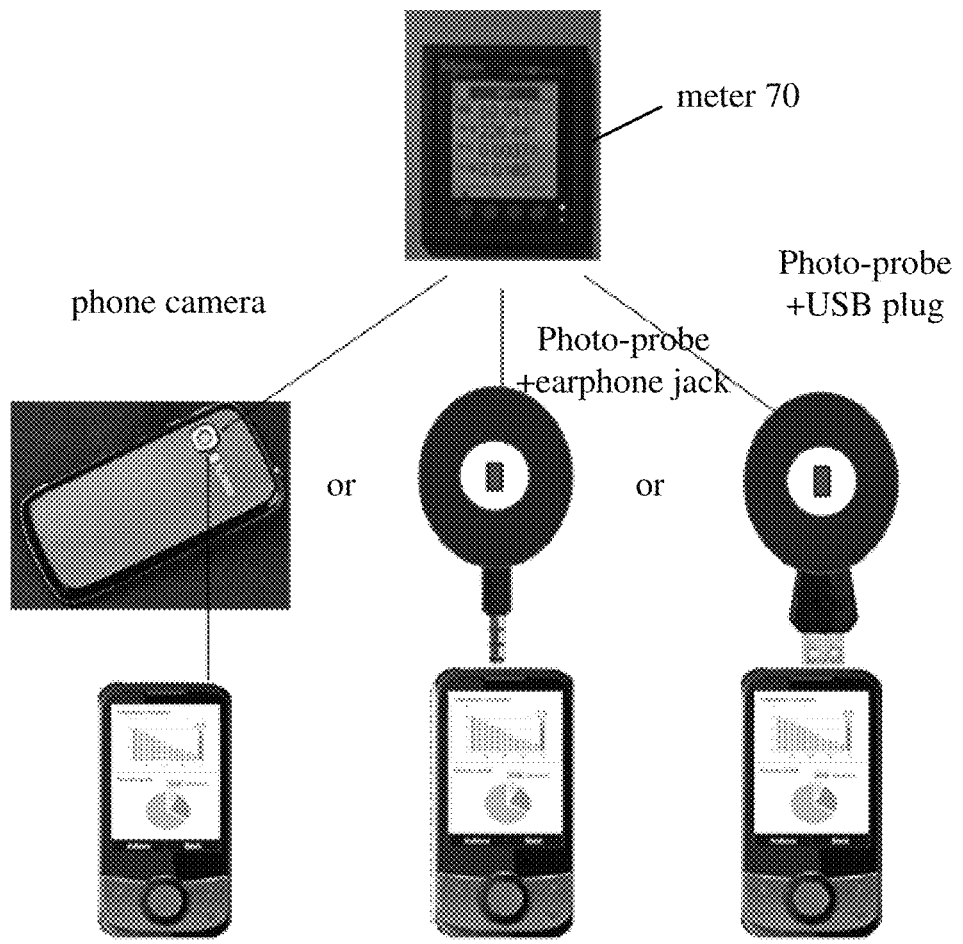
FIG. 7 illustrates a second embodiment, namely a phone electricity meter-reading system, to which the system for wireless data transmission according to the present disclosure is applied.

FIG. 7 illustrates a second embodiment, namely a phone electricity meter-reading system, to which the system for wireless data transmission according to the present disclosure is applied.

An application of the phone electricity meter-reading system shown in FIG. 7 is the same as that of the optical electricity meter-reading system shown in FIG. 5, both are used for recording the power consumption data of the electricity meter 70 with a display, therefore the data transmitting end apparatus located at the electricity meter 70 side is the same as that described in connection with FIG. 5. The phone electricity meter-reading system shown in FIG. 7 is different from the optical electricity meter-reading system shown in FIG. 5 in the implementation of the data receiving end apparatus.

The electricity meter-reading system in FIG. 7 reads and modulates the optical pulses with a smart phone, and then performs various processing on the data of electricity meter with phone applications stored in the phone, and may realize a transmission of data to a cloud device, so that a higher level information management is realized.

There are many options for reading by the phone the optical pulses transmitted with the display backlight of the electricity meter, and follows are only some examples.

Figure 8:
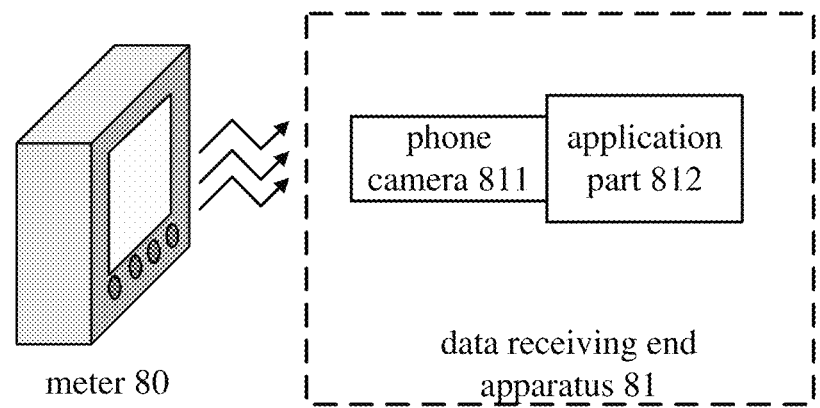
FIG. 8 illustrates a first exemplary block diagram of a structure of the phone electricity meter-reading system shown in FIG. 7.

Method 1: as illustrated in FIG. 8, images of a display screen of the electricity meter 80 are shot with a phone camera 811 directly, the sequence of light and dark signals issued by the display backlight member of the electricity meter is obtained by analyzing a light and dark timing in a background of the shot image, then the sequence of light and dark signals are processed and demodulated by an application part 812 built in the phone so as to obtain the recovered data corresponding to the power consumption data of the electricity meter 80 and the identifier data of electricity meter 80 itself, and various data analysis and process are applied on the recovered data.

Figure 9:
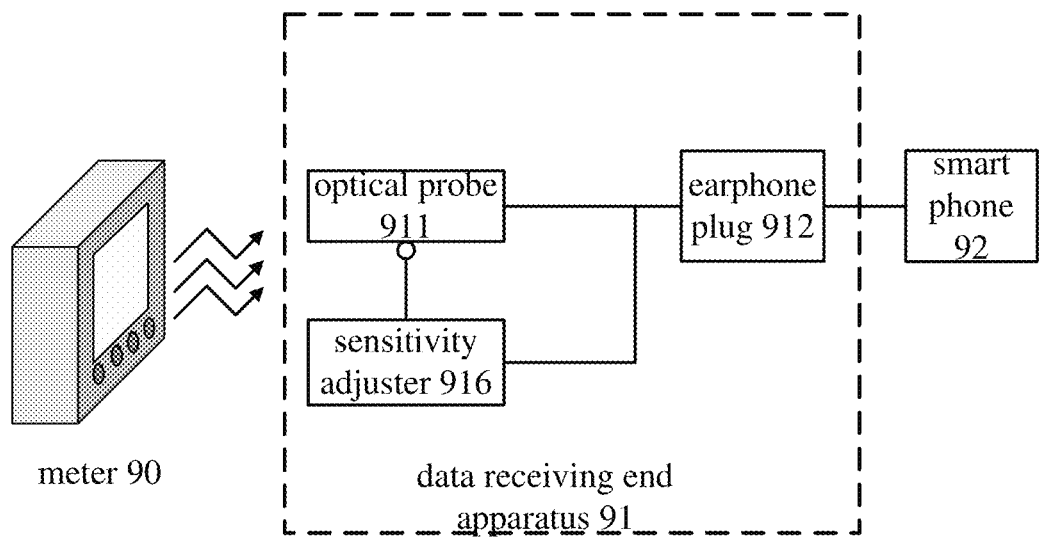
FIG. 9 illustrates a second exemplary block diagram of a structure of the phone electricity meter-reading system shown in FIG. 7.

Method 2: as illustrated in FIG. 9, the sequence of light and dark signals issued from the display backlight member in the electricity meter 90 is detected and optically-electrically converted into the electrical signals to be output by an external optical probe 911, an output interface member of the optical probe is designed as a plug compatible with an earphone jack on the phone 92, and after the plug of the optical probe 911 is connected to the phone 92 via the earphone jack, the phone 92 may receive the electrical signals converted by the optical probe 911, which correspond to the sequence of light and dark signals issued from the display backlight member of the electricity meter 90, demodulate the electrical signals into the recovered data corresponding to the power consumption data of the electricity meter and the identifier data of electricity meter itself through the applications built in the phone 92, and apply various data analysis and process on the recovered data.

Figure 10:
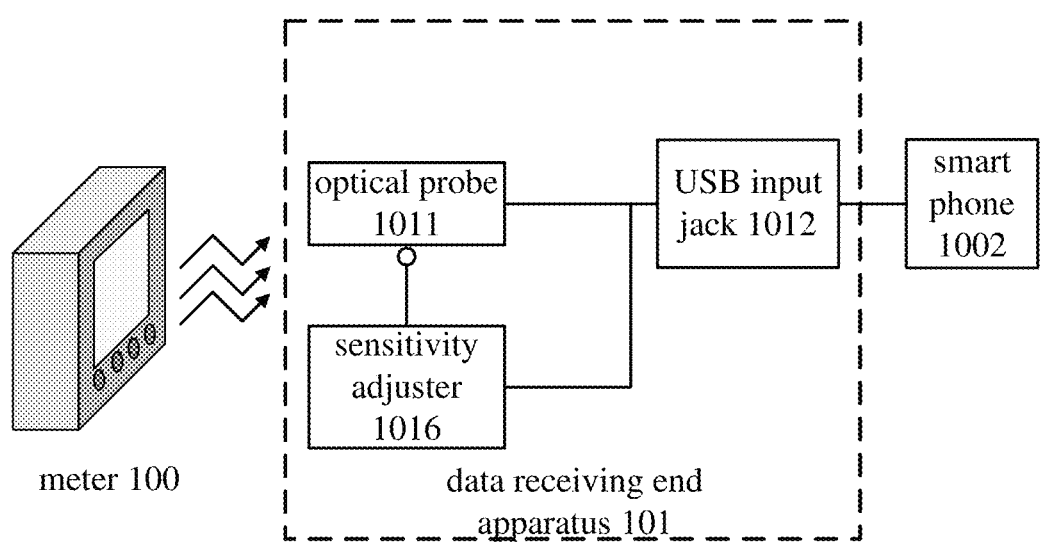
FIG. 10 illustrates a third exemplary block diagram of a structure of the phone electricity meter-reading system shown in FIG. 7.

Method 3: as illustrated in FIG. 10, the sequence of light and dark signals issued from the display backlight member in the electricity meter 100 is detected and optically-electrically converted into the electrical signals by an external optical probe 1011, the electrical signals are demodulated into the recovered data corresponding to the power consumption data of the electricity meter and the identifier data of electricity meter itself through firmware of a microprocessor built in the optical probe 1011, and then is transferred to a phone 102 via a USB interface, so that the user can process and analyze the data by programming the applications in the phone or transfer the data to the higher level network.

The three methods are described in further detail below.

FIG. 8 illustrates a first exemplary block diagram of a structure of the phone electricity meter-reading system shown in FIG. 7, which corresponds to the Method 1 shown in FIG. 7. Wherein the data transmitting end apparatus located at the electricity meter 80 side is the same as that described in connection with FIG. 5, so details are not repeated herein.

The data receiving end apparatus 81 of the phone electricity meter-reading system illustrated in FIG. 8 is constructed with the smart phone, and comprises: the phone camera 811 configured to receive the optical pulses corresponding to the data of the electricity meter 80; and the part 812, disposed in the phone, configured to perform various processing and transmit the optical pulses corresponding to the data of the electricity meter 80 received by the phone camera 811. Thus, the intelligent management and higher level information processing on the data of the electricity meter 80 can be realized.

FIG. 9 illustrates a second exemplary block diagram of a structure of the phone electricity meter-reading system shown in FIG. 7, which corresponds to the Method 2 illustrated in FIG. 7. Wherein the data transmitting end apparatus located at the electricity meter 90 side is the same as that described in connection with FIG. 5, so details are not repeated herein.

The data receiving end apparatus 91 of the phone electricity meter-reading system illustrated in FIG. 9 comprises the external optical probe 911 and the earphone plug 912 to be connected to the phone. Additionally, the data receiving end apparatus 91 may further comprise the sensitivity adjuster 916 configured to adjust the sensitivity of the optical probe 911.

The optical pulses issued from the display backlight member are detected and optically-electrically converted into the electrical signals to be output by the external optical probe 911, the output interface member of the optical probe 911 is designed as the earphone plug 912 compatible with the earphone jack on the phone, and after the earphone plug 912 of the optical probe 911 is connected to the phone via the earphone jack of the phone, the phone may receive the electrical signals converted by the optical probe 911, which correspond to the optical-electrical pulse signals issued from the display backlight member of the electricity meter 90, demodulate the electrical signals into the recovered data corresponding to the power consumption data of the electricity meter 90 and the identifier data of electricity meter itself through the programmed applications in the phone, and apply various data analysis and process on the recovered data.

FIG. 10 illustrates a third exemplary block diagram of a structure of the phone electricity meter-reading system shown in FIG. 7, which corresponds to the Method 3 shown in FIG. 7. Wherein the data transmitting end apparatus located at the electricity meter 100 side is the same as that described in connection with FIG. 5, so details are not repeated herein.

The data receiving end apparatus 101 of the phone electricity meter-reading system illustrated in FIG. 10 comprises the external optical probe 1011 and the USB input jack 1012 to be connected to the phone. Additionally, the data receiving end apparatus 101 may further comprise the sensitivity adjuster 1016 configured to adjust the sensitivity of the optical probe 1011.

The optical pulses issued from the display backlight member is detected and optically-electrically converted into the electrical signals by the external optical probe 1011, the electrical signals are demodulated into the recovered data corresponding to the power consumption data of the electricity meter and the identifier data of electricity meter itself through the firmware of a microprocessor built in the optical probe 1011, and then is transferred to the phone via the USB input jack 1012, so that the recovered data can be undergone various data analysis and process through the programmed applications in the phone.

Although some exemplary embodiments have been explained above, those skilled in the art can understand that many modifications, replacements and/or changes are possible. For example, in the data receiving end apparatus according to the present disclosure, (1) binary codes of the data may be represented by a high speed light-dark switching of the display backlight so as to realize the data transmission; (2) the binary codes of the data may be represent by the high speed light-dark switching of respective stroke segments, which are in a display state, of a segment code LED display so as to realize the data transmission; and (3) the binary codes of the data may be represented by the high speed light-dark switching of indicator lamps on an instrument so as to realize the data transmission. On the data receiving end apparatus according to the present disclosure, regarding the receiving of the data, the camera of the phone may be used to directly receive the pulse signals from the instrument display backlight, and then the related data is analyzed. Alternatively, an optical receiver probe may be connected to the USB interface or the earphone jack of the phone, and the data transmitted from the instrument by means of any one of the manners (1), (2) (3) described above may be optically-electrically converted and transferred to the phone, so that the device data can be transferred to the client device via the phone in order to realize the higher level data management.

Those skilled in the art would understand that other changes and/or modifications can be made to certain embodiments without departing from the spirit or scope of the present disclosure described broadly. Therefore, anyway, the embodiments would be constructed as illustrative other than limitative.

What is claimed is:

1. An apparatus for transmitting wireless data using a display backlight, comprising:
   a data storage unit configured to store data to be transmitted;
   a main control unit configured to read the data stored in the data storage unit;
   a signal modulation unit configured to modulate the data with a predetermined signal modulation method under the control of the main control unit to generate and output a sequence of switching pulse signals;
   a light source driving circuit configured to generate a backlight driving switching pulse signal according to the sequence of switching pulse signals; and
   a display backlight member configured to output a sequence of light and dark signals, driven by the backlight driving switching pulse signal,
   wherein the apparatus is in combination with an optical probe configured to read the sequence of light and dark signals output by the display backlight member and optically-electrically convert the sequence of light and dark signals, and to generate a sequence of switching pulse signals, the optical probe including:
   a receiving-end microprocessor configured to demodulate the sequence of switching pulse signals with a predetermined signal demodulation method to generate recovered data and to further process recovered data.

2. The apparatus for transmitting wireless data of claim 1, wherein the predetermined signal modulation method is a signal modulation method of Different Pulses in Fixed Period Modulation, wherein a pulse period is fixed, one digital bit state is transmitted in each period, a first number of rectangle wave pulses with a first width is transmitted in one period in order to represent a first digital bit state, and a second number of rectangle wave pulses with a second width is transmitted in another period in order to represent a second digital bit state.

3. The apparatus for transmitting wireless data of claim 2, wherein a sum of widths of pulse high levels in the first number of rectangle wave pulses is equal to a sum of widths of pulse high levels in the second number of rectangle wave pulses.

4. The apparatus for transmitting wireless data of claim 1, wherein the predetermined signal modulation method is a signal modulation method of Variable Pulse Period Modulation, wherein the pulse period is variable, a pulse with a first pulse width representing a first digital bit state or another pulse with a second pulse width representing a second digital bit state is transmitted in one period, the first pulse width is different from the second pulse width.

5. The apparatus for transmitting wireless data of claim 4, wherein a ratio of a pulse low level time to a pulse high level time when a digital bit is transmitted is smaller than a predetermined threshold.

6. The apparatus for transmitting wireless data of claim 1, wherein the main control unit, the data storage unit, the signal modulation unit, the light source driving unit and the display backlight member are implemented in a measurement instrument.

7. The apparatus for transmitting wireless data of claim 1, wherein the apparatus is implemented within an electricity meter, and wherein the data comprises power consumption data measured by the electricity meter and an identifier of the electricity meter.

8. The apparatus for transmitting wireless data of claim 7 wherein the recovered data is power consumption numerical readings of the electricity meter and the identifier of the electricity meter; and
the optical probe further includes a battery configured to supply operating power to components of the optical recording pen.

9. An apparatus for receiving wireless data by using a display backlight, comprising:
an optical probe configured to receive a sequence of light and dark signals transmitted with the display backlight and optically-electrically convert the sequence of light and dark signals to generate a sequence of switching pulse signals;
a main control unit;
a digital decoding unit configured to demodulate the sequence of switching pulse signals with a predetermined signal demodulation method under the control of the main control unit to generate recovered data; and
a digital processing and displaying unit configured to process the recovered data under the control of the main control unit.

10. The apparatus for receiving wireless data of claim 9, wherein the predetermined signal demodulation method performs demodulation according to modulation rules as follows: a pulse period is fixed, one digital bit state is transmitted in each period, a first number of rectangle wave pulses with a first width is transmitted in one period in order to represent a first digital bit state, and a second number of rectangle wave pulses with a second width is transmitted in another period in order to represent a second digital bit state.

11. The apparatus for receiving wireless data of claim 10, wherein a sum of widths of pulse high levels in the first number of rectangle wave pulses is equal to a sum of widths of pulse high levels in the second number of rectangle wave pulses.

12. The apparatus for receiving wireless data of claim 9, wherein the predetermined signal demodulation method performs demodulation according to modulation rules as follows: the pulse period is variable, a pulse with a first pulse width representing a first digital bit state or another pulse with a second pulse width representing a second digital bit state is transmitted in one period, the first pulse width is different from the second pulse width.

13. The apparatus for receiving wireless data of claim 12, wherein a ratio of a pulse low level time to a pulse high level time when a digital bit is transmitted is smaller than a predetermined threshold.

14. The apparatus for receiving wireless data of claim 9, wherein the data is data related to numerical readings of a measurement instrument, and the optical probe receives the sequence of light and dark signals periodically or as required.

15. The apparatus for receiving wireless data of claim 9, wherein the process on the recovered data includes displaying data, storing data and transmitting data to a higher level network.

16. An optical recording pen for recording power consumption numerical readings of an electricity meter, comprising:
an optical probe, disposed at a head position of the optical recording pen, configured to read a sequence of light and dark signals transmitted with a display backlight in the electricity meter and optically-electrically convert the sequence of light and dark signals so as to generate a sequence of switching pulse signals;
a main control unit (MCU) configured to demodulate and further process the sequence of switching pulse signals to obtain power consumption numerical readings of the electricity meter and an identifier of the electricity meter; and
a recording pen display, located at a tail of the optical recording pen, configured to display the obtained power consumption numerical readings of the electricity meter.

* * * * *